(12) United States Patent
Shizawa

(10) Patent No.: US 6,260,032 B1
(45) Date of Patent: *Jul. 10, 2001

(54) METHOD FOR LEARNING MULTIVALUED MAPPING

(75) Inventor: Masahiko Shizawa, Shiki (JP)

(73) Assignee: Japan Science And Technology Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/934,745

(22) Filed: Sep. 22, 1997

(30) Foreign Application Priority Data

Sep. 24, 1996 (JP) .................................................. 8-251413

(51) Int. Cl.[7] ...................................................... G06E 1/00
(52) U.S. Cl. ................................. 706/17; 706/23; 706/48
(58) Field of Search ................................. 706/15–17, 25, 706/12, 14, 7, 23, 20, 48, 52

(56) References Cited

U.S. PATENT DOCUMENTS

| | | | |
|---|---|---|---|
| 5,083,285 | * 1/1992 | Shima et al. ............................ | 706/33 |
| 5,268,834 | * 12/1993 | Sanner et al. ........................... | 706/31 |
| 5,276,771 | * 1/1994 | Manukian et al. ...................... | 706/25 |
| 5,416,899 | * 5/1995 | Poggio et al. ......................... | 395/175 |
| 5,446,828 | * 8/1995 | Woodall ................................. | 706/25 |
| 5,568,590 | * 10/1996 | Tolson ................................... | 706/13 |
| 5,613,041 | * 3/1997 | Keeler et al. ........................... | 706/17 |
| 5,729,660 | * 3/1998 | Chiabrera et al. ...................... | 706/16 |
| 5,774,631 | * 6/1998 | Chiabrera et al. ...................... | 706/20 |
| 5,987,444 | * 11/1999 | Lo ......................................... | 706/25 |
| 6,173,218 | * 1/2001 | Vian ........................................ | 701/1 |

OTHER PUBLICATIONS

Vijaykumar et al, "Fast and efficient incremental learning for high dimensional movement systems" ICRA–IEEE, pp 1894–1899, Apr. 2000.*
Lee et al< "Indentification and control of dynamic systems using recurrent fuzzy neural networks", Trans. of Fuzzy Systems IEEE, pp 349–366, vol. 8, No. 4, Aug. 2000.*
Piovoso et al, "Neural network process control", ACM, pp 84–94, May 1991.*
Hu et al, "Approximation the longest approximate common subsequence problem", ACM pp 166–172, Sep. 1998.*
Koiran, "Efficient learning of contineous neural network", COLT ACM, pp 348–355, Apr. 2000.*
M. Shizawa, "Multi–Valued Regularization Network: A Theory of Multi–Layer Networks for Learning Many–to–H Mappings," Journal of the Institute of Electronics, Information, and Communication Engineers [English Translation], vol. J78–A, No. 3, pp. 427–439, Mar. 1995.*

(List continued on next page.)

Primary Examiner—Mark R. Powell
Assistant Examiner—Anil Khatri
(74) Attorney, Agent, or Firm—Lorusso & Loud

(57) ABSTRACT

A method for learning multivalued mapping comprises the steps of: mathematically expressing a multivalued function directly in Kronecker's tensor product form; developing and replacing the tensor product form so as to obtain a linear equation with respect to unknown functions; defining a sum of a linear combination of local base functions and a linear combination of polynomial bases with respect to the replaced unknown function; and learning or structuring a manifold which is defined by the linearized functions in the input-output space, from example data, through use of a procedure for optimizing the error and the smoothness constraint. Therefore, mapping learning can be performed from a small amount of data.

7 Claims, 3 Drawing Sheets

OTHER PUBLICATIONS

M. Shizawa, "Regularization Networks for Approximating Multi–Valued Functions: Learning Ambiguous Input–Output Mappings from Examples," 1994 IEEE Int. Conference on Neural Networks, vol. 1, pp. 137–142, Jul. 1994.*

M. Shizawa, "Multi–Valued Regularization Network—A Theory of Multi–layer Networks for Learning Many–to–h Mappings" (abstract), Transactions of the Institute of Electronics, Information, and Communications engineers, vol. J78–A, No. 3, pp. 427–439, Mar. 1995.*

T. Poggio et al., "From Regularization to Radial, Tensor and Additive Splines," Proceedings of the 1993 IEEE–SP Workshop on Neural Networks for Processing, pp. 3–10, Sep. 1993.*

T. Poggio et al., "Networks for Approximation and Learning," Proceedings of the IEEE, vol. 78, No. 9, pp. 1481–1497, Sep. 1990.*

* cited by examiner

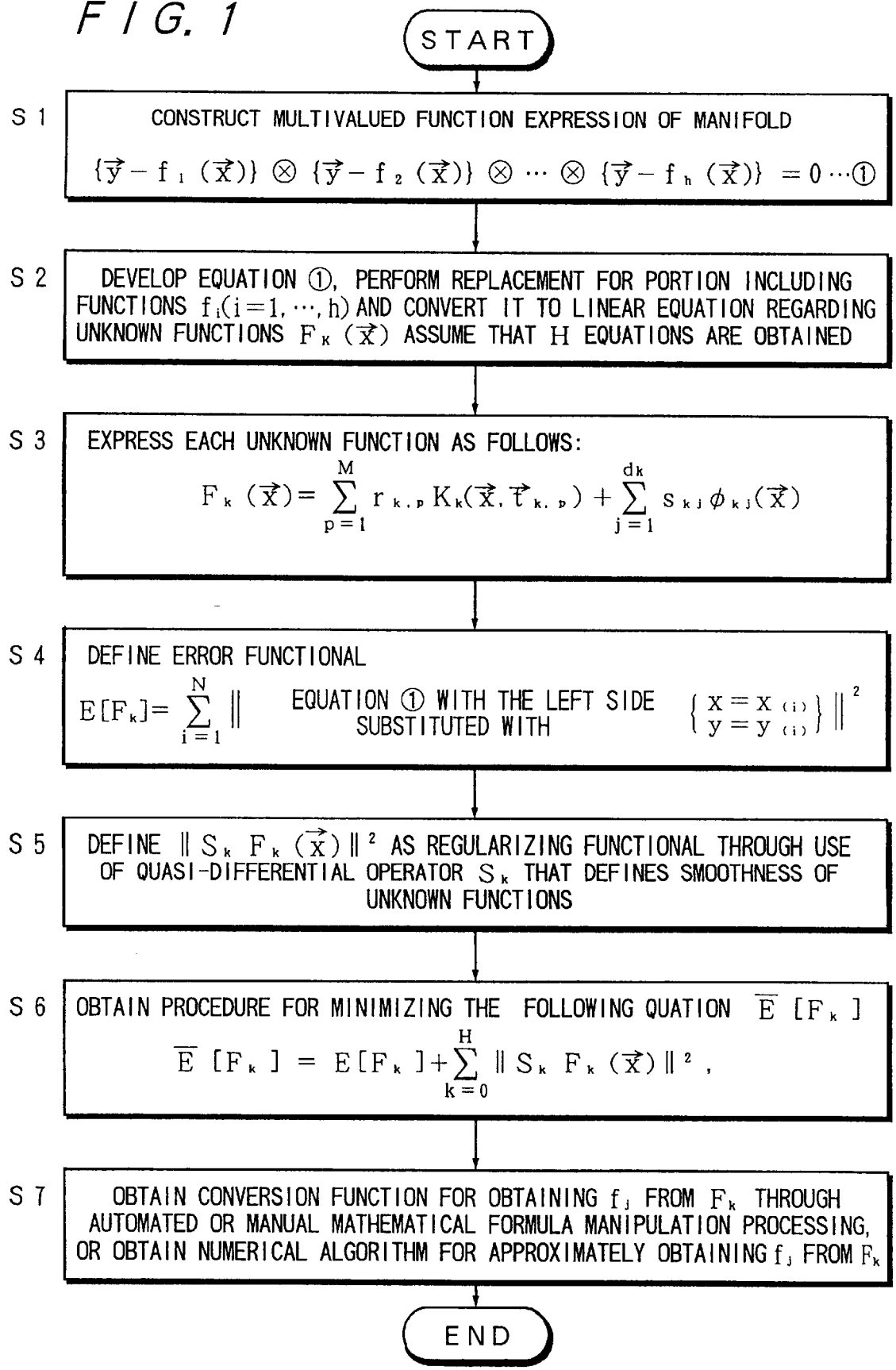

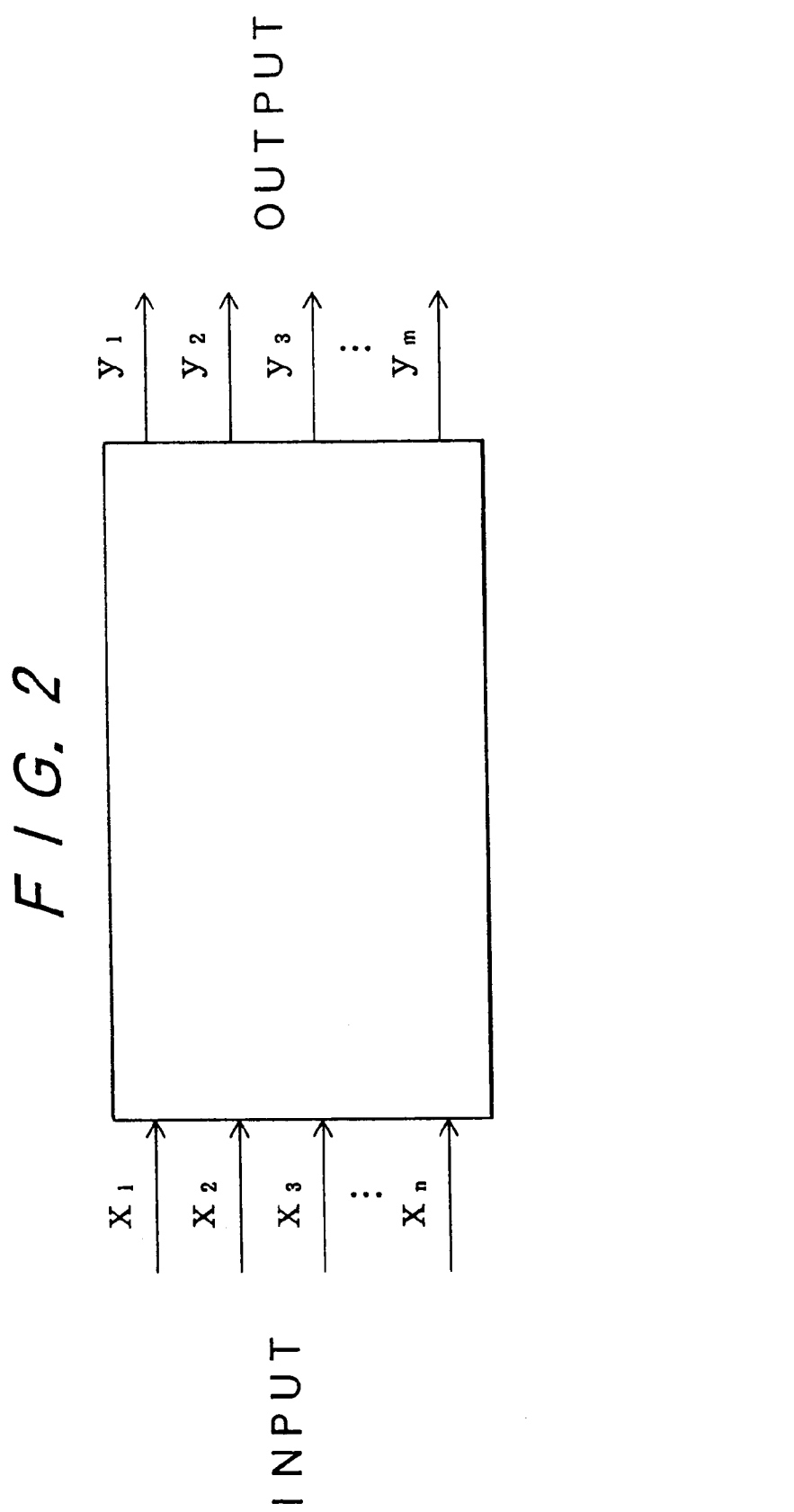

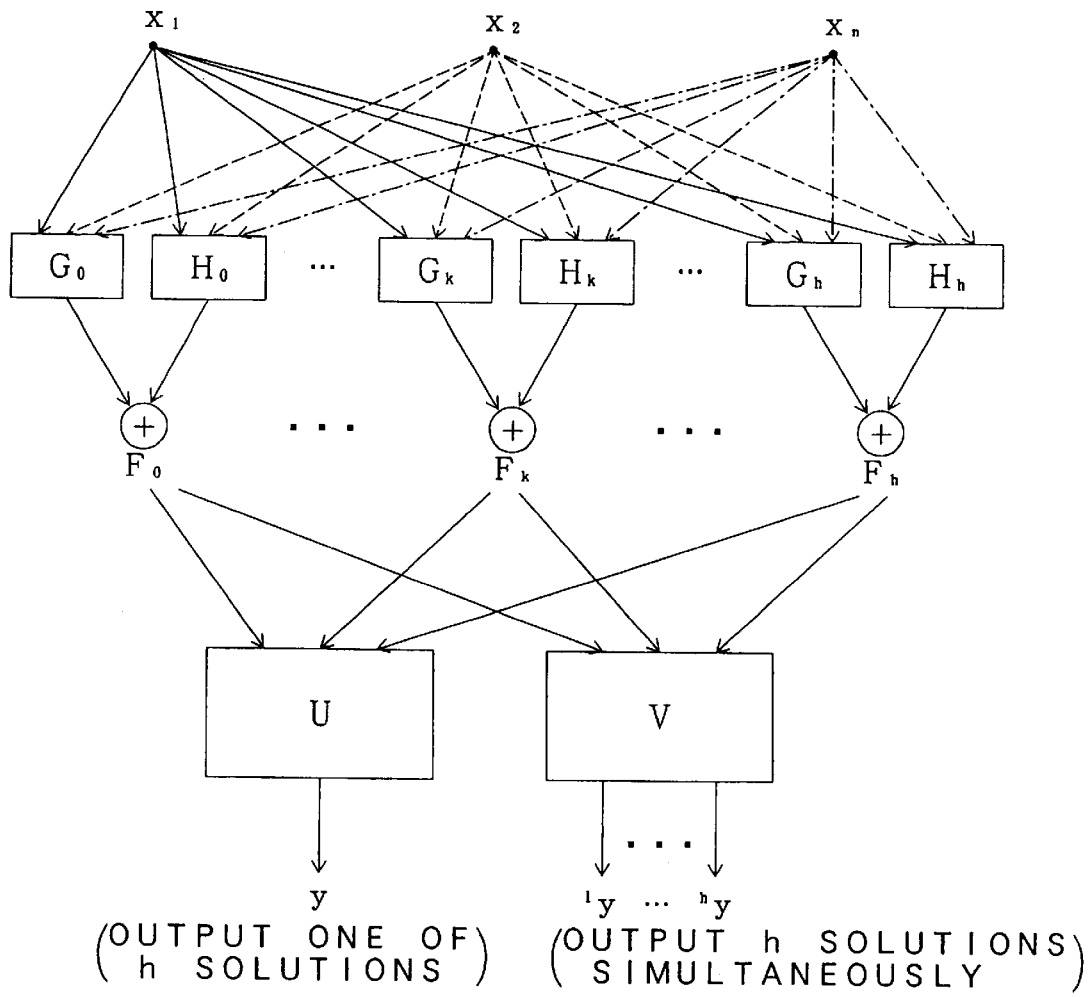

METHOD FOR LEARNING MULTIVALUED MAPPING

BACKGROUND OF THE INVENTION

1. Field of the Invention

The present invention relates to a method for structuring a computing module for learning non-linear mapping which is generally a multivalued mapping. More specifically, the invention relates to a method for learning multivalued mapping by a functional approximation which enables learning to obtain an overview of the multifold structure of the mapping from a small amount of example data and also enables learning local changes.

2. Description of the Related Art

The inventor of the present invention proposed a method for multivalued function approximation (see Japanese Patent Application Laid Open (kokai) No. 7-93296, "Method for Learning Multivalued Function" and Transactions of the Institute of Electronics, Information and Communication Engineers of Japan A, vol. J78-A, No. 3, pp. 427–439 (1995) "Multivalued Regularization Network").

However, in the above-mentioned method for multivalued function approximation, only locally defined base functions are used, although multivalued functions can be expressed. Namely, $F_k$ is expressed by a function of a linear sum of the local base functions centering on $\vec{t}_{kp}$, as follows:

$$F_k(\vec{x}) = \sum_{p=1}^{M} r_{kp} K_{kp}(\vec{x}, \vec{t}_{kp}) \tag{1}$$

The above mentioned Japanese Patent Application Laid Open No. 7-93296 describes an example wherein the center $\vec{t}_{kp}$ coincides with the input portion $\vec{x}_{(i)}$ of the teaching data.

However, in the above-mentioned method for multivalued function approximation, since base functions are defined only in the vicinity of the teaching data or the center $\vec{t}_{kp}$, functions are not defined where the teaching data do not exist. Another problem is that when the numbers of input and output space dimensions (m+n) become large the required amount of teaching data remarkably increases.

SUMMARY OF THE INVENTION

An object of the present invention is to solve the above-mentioned problems and to provide a method for learning multivalued mapping.

The method for learning multivalued mapping according to the present invention provides a method for approximation of a manifold in (n+m)-dimensional space expressing a mapping computation module having n inputs and m outputs.

According to a first aspect of the present invention, there is provided a method for learning multivalued mapping for providing a method for approximation of manifold in (n+m)-dimensional space, by learning a smooth function from n-dimensional input space to m-dimensional output space which optimally approximates m-dimensional vector value data forming a given plurality of layers in n-dimensional space, the method comprising steps of:

(a) mathematically expressing a multivalued function directly in Kronecker's tensor product form;

(b) developing and replacing the functions so as to obtain linear equations with respect to unknown functions;

(c) defining the sum of a linear combination of local base functions and a linear combination of polynomial bases with respect to the replaced unknown function; and (d) learning from example data, an manifold which is defined by the linearized function in the input-output space, through use of a procedure for optimizing the error and the smoothness constraint.

According to a second aspect of the present invention, there is provided a method for learning multivalued mapping for providing a method for approximation of manifold in (n+m)-dimensional space, by obtaining a smooth function from n-dimensional input space to m-dimensional output space which optimally approximates m-dimensional vector value data forming a given plurality of layers in n-dimensional space, the method comprising steps of:

(a) expressing a manifold by synthesizing h m-dimensional vector value functions in n-dimensional space according to the following equation:

$$\{\vec{y} - \vec{f}_1(\vec{x})\} \otimes \{\vec{y} - \vec{f}_2(\vec{x})\} \otimes \ldots \otimes \{\vec{y} - \vec{f}_h(\vec{x})\} = 0 \tag{2}$$

wherein "$\otimes$" denotes Kronecker's tensor product, $$\vec{x} = (x_1, x_2, \ldots x_n)^T,$$

$$\vec{y} = (y_1, y_2, \ldots y_m)^T,$$

and "T" denotes transposition of a vector;

(b) developing the above equation and converting it into a linear equation with respect to unknown functions;

(c) expressing each unknown function as:

$$F_k(\vec{x}) = \sum_{p=1}^{M} r_{kp} K_{kp}(\vec{x}, \vec{t}_{kp}) + \sum_{j=1}^{d_k} s_{kj} \phi_{kj}(\vec{x}); \tag{3}$$

(d) defining an error functional for calculating the error on the left side of Equation (2) for calculating the unknown function $F_k$ from the example data;

(e) defining a regularizing functional as the square of the absolute value of the result of the operation in which the operator defining the smoothness constraint of the unknown function is applied to each unknown function, as required, (f) minimizing the error functional and the regularizing functional, and deriving a procedure for obtaining the unknown functions $F_k$; and (g) obtaining a conversion function for calculating $f_j$ from the unknown functions $F_k$ by formula manipulation method or by numerical approximation algorithm.

In the method for learning multivalued mapping according to the second aspect, m may be 1 or 2.

In the method for learning multivalued mapping according to the second aspect, the equality $\vec{t}_{0p} = \vec{t}_{1p} = \vec{t}_{2p} = \ldots = \vec{t}_{hp}$ may be satisfied.

In the method for learning multivalued mapping according to the second aspect, N pairs of example data may be [($\vec{x}_{(i)}, \vec{y}_{(i)}$)|i=1, 2, ..., N], and M=N, $\vec{t}_{kp} = \vec{x}_{(p)}$ (wherein p=1, 2, ..., N).

In the method for learning multivalued mapping according to the second aspect, the equality $K_{k1} = K_{k2} = \ldots = K_{kM}$ (wherein k=0, 1, 2, ..., h) may be satisfied.

BRIEF DESCRIPTION OF THE DRAWINGS

FIG. 1 is a flow chart showing the method for learning multivalued mapping according to the present invention;

FIG. 2 is a block diagram showing a mapping calculation module for the method for learning multivalued mapping according to the present invention; and FIG. 3 is a detailed block diagram showing a mapping calculation module for the method for learning multivalued mapping according to the present invention.

DESCRIPTION OF THE PREFERRED EMBODIMENTS

The embodiments of the present invention will next be described in detail with reference to the drawings.

For a given $n(n=1, 2, \ldots)$ and a given $m$ ($m=1, 2, \ldots$), a mapping calculation module having an n-dimensional real value input $\vec{x} = (x_1, x_2, \ldots, x_n)$ and an m-dimensional real value output $\vec{y} = (y_1, y_2, \ldots, y_m)$ is considered.

Determining internal parameters of this mapping calculation module from a given pair of input and output is called learning of mapping. The function of this calculation module is defined by a manifold (surface in high-dimensional space) in (n+m)-dimensional space $(x_1, x_2, \ldots, x_n, y_1, y_2, \ldots, y_m)$ (hereinafter referred to as "input-output space") which is formed by combining the input space and the output space. The restoration procedure for derivation of this manifold from a small number of pairs (N pairs) of example data $\{(\vec{x}_{(i)}, \vec{y}_{(i)}) | i=1, 2, \ldots, N\}$ is an approximation of multivalued mapping.

In the above-mentioned references (Japanese Patent Application Laid Open No. 7-93296 and Transactions of the Institute of Electronics, Information and Communication Engineers of Japan A, vol. J78-A, No. 3, pp. 427–439 (1995) "Multivalued Regularization Network"), the inventor of the present invention proposed a method for reducing the learning of a multivalued mapping function to a problem of optimization of energy functional which is defined by a tensor equation directly expressing the multivalued function and a regularization operator constraining smoothness of the function.

However, the algorithm derived in the above-mentioned references cannot perform overall approximation covering all the input-output space, although local approximation can be performed in the vicinity of each piece of example data. Therefore, when only a small amount of example data are available overall approximation covering the entire input-output space is difficult.

Overall approximation using polynomial equations, such as the Lagrange's interpolation method, is a well-known technique for approximation by single-valued functions. However, these methods are said to be poor in local approximation and to cause an oscillation where example data do not exist. Moreover, conventional function approximation methods cannot yield a plurality of possible values for output, since it cannot express a multivalued function.

The present invention realizes an approximation method that simultaneously provides both overall approximation and local approximation.

A case when $m=1$ is described below. The output variable is denoted $y$, which can assume a maximum of $h$ ($h=1, 2, \ldots$) real values. Namely, the mapping is expressed in terms of an h-valued function. Then, the constraining manifold is expressed by the following equation:

$$y^h F_h(\vec{x}) + y^{h-1} F_{h-1}(\vec{x}) + \ldots + y F_1(\vec{x}) + F_0(\vec{x}) = 0. \quad (4)$$

According to the present invention, (h+1) functions of $F_k(x)$ ($k=0, 1, 2, \ldots, h$) are expressed in the following equation:

$$F_k(\vec{x}) = \sum_{p=1}^{M} r_{kp} K_{kp}(\vec{x}, \vec{t}_{kp}) + \sum_{j=1}^{d_k} s_{kj} \phi_{kj}(\vec{x}). \quad (5)$$

wherein $K_{kp}(\vec{x}, \vec{t}_{kp})$ ($p=0, 1, 2, \ldots, M$) is a local base function centering at $\vec{t}_{kp}$, and $\phi_{kj}(\vec{x})$ is the base of a multi-variable polynomial equation having $x_i$ of $\vec{x} = (x_1, \ldots, x_n)$ as variables. Thus, $F_k(x)$ includes a term that is the linear sum of local base functions and a term of multi-variable polynomial equations (which are defined in an overall view).

In this case, the mapping calculation module has base functions $K_{kp}(\vec{x}, \vec{t}_{kp})$, centers of the base functions $\vec{t}_{kp}$, selection of degree and base of the polynomial equation term, and parameters of factors $r_{kp}$ and $s_{kj}$. Calculation of all of these from example data is not realistic. Especially when the number of example data sets is very small, it is realistic to approximate in a wide view only by the multi-variable polynomial term.

In a case of $m>1$, a similar discussion can be applied, based on a developed equation of the following equation:

$$\{\vec{y} - f_1(\vec{x})\} \otimes \{\vec{y} - f_2(\vec{x})\} \otimes \ldots \otimes \{\vec{y} - f_h(\vec{x})\} = 0. \quad (6)$$

As described later, a case of $m=2$ can also be shown as an example.

A first embodiment of the present invention will now be described with reference to a flow chart shown in FIG. 1.

A case of the first embodiment is described, wherein $m=1$, $K_{k1} = K_{k2} = \ldots = K_{kM}$ ($k=0, 1, \ldots, h$), $M=N$, and $\vec{t}_{kp} = \vec{x}(p)$ ($p=1, 2, \ldots, N$).

(1) A multivalued function expression of a manifold is constructed, wherein an h-valued function is expressed as follows (Step S1):

$$\{y - f_1(\vec{x})\}\{y - f_2(\vec{x})\} \ldots \{y - f_h(\vec{x})\} = 0. \quad (7)$$

(2) The above equation is developed, and the following equation is obtained using functions $F_k(x)$ ($k=0, 1, \ldots, h$), so that all the coefficients of $y^i$ in the terms may be functional terms (Step S2):

$$y^h F_h(\vec{x}) + y^{h-1} F_{h-1}(\vec{x}) + \ldots + y F_1(\vec{x}) + F_0(\vec{x}) = 0. \quad (8)$$

(3) The (h+1) functions $F_k(\vec{x})$ ($k=0, 1, \ldots, h$) are expressed as follows (Step S3):

$$F_k(\vec{x}) = \sum_{p=1}^{M} r_{kp} K_k(\vec{x}, \vec{x}_{(p)}) + \sum_{j=1}^{d_k} s_{kj} \phi_{kj}(\vec{x}), \quad (9)$$

wherein $K_k(\vec{x}, \vec{x}_{(i)})$ is a local base function centering at $\vec{x}_{(i)}$, and $K_k = K_{k1} = K_{k2} = \ldots = K_{kM}$ is assumed. "$\phi_{kj}(\vec{x})$" is the base of the multi-variable polynomial with $x_i$ of $\vec{x} = (x_1, \ldots, x_n)$ as variables.

(4) An error functional is defined by the following equation (Step 4):

$$E[F_k] = \frac{1}{N}\sum_{i=1}^{N} \{y_{(i)}^h F_h(\vec{x}_{(i)}) + y_{(i)}^{h-1}(\vec{x}_{(i)}) + \ldots + y_{(i)} F_1(\vec{x}_{(i)}) + F_0(\vec{x}_{(i)})\}^2 \quad (10)$$

(5) A regularization operator $S_k$ is defined as a linear combination of quasi-differential operators:

$$S_k \sum_i a_{ki}(\vec{x}) \frac{\partial^{i_1 + \ldots + i_n}}{\partial x_1^{i_1} \ldots \partial x_n^{i_n}}$$

where $i = (i_1, i_2, \ldots, i_n)$, provided that $$\sum_i \equiv \sum_{i_1} \sum_{i_2} \ldots \sum_{i_n}$$

and $a_{ki}(\vec{x})$ is a function of $\vec{x}$ (Step 5). Then the regularizing functional of the unknown function $F_k$ is $$\|S_k F_k(\vec{x})\|^2. \quad (11)$$

(6) The procedure for minimizing the functional $$E[F_k] = E[F_k] + \sum_{k=0}^{h} \|S_k F_k(\vec{x})\|^2 \quad (12)$$

is obtained (Step S6) under the condition of $$\sum_{k=0}^{h} \left( \sum_{p=1}^{M} r_{kp}^2 + \sum_{j=1}^{d_k} s_{kj}^2 \right) = 1. \quad (13)$$

This procedure is obtained through use of a conventional method such as Lagrange's method of indeterminate coefficients for conditioned optimization. Many other standard optimization methods can be applied.

(7) For obtaining $f_j$ from $F_k$, many methods can be applied for solving the following h-degree algebraic equation:

$$\Lambda(F_k, y) = y^h F_h(\vec{x}) + y^{h-1} F_{h-1}(\vec{x}) + \ldots + y F_1(\vec{x}) + F_0(\vec{x}) = 0 \quad (14)$$

(Step S7).

To obtain only one solution for this equation, the Newton-Laphson method can be used, wherein iterative calculation of $$y^{[k+1]} := y^{[k]} - \frac{\Lambda(F_k, y^{[k]})}{\Lambda_y(F_k, y^{[k]})} \quad (15)$$

is performed, wherein k denotes a variable representing the number of iterations, and $$\Lambda_y(F_k, y) = \frac{\partial \Lambda}{\partial y} = h F_h y^{h-1} + \ldots + j F_j y^{j-1} + \ldots + F_1. \quad (16)$$

Other algorithms can be used as that described in Transactions of the Institute of Electronics, Information and Communication Engineers of Japan A, vol. J78-A, No. 3, pp. 427–439 (1995).

A second embodiment will now be described.

A case of the second embodiment will now be described, wherein m=2, h=2, $K_{k1}=K_{k2}=\ldots=K_{kM}=K_k$ (k=0, 1, ..., h), M=N, and $t_{kp}=x_{(p)}$ (p=1, 2, ..., N).

(1) A manifold defining a mapping is expressed in a form synthesizing two 2-dimensional vector value functions in n-dimensional space as follows:

$$\{\vec{y} - f_1(\vec{x})\} \otimes \{\vec{y} - f_2(\vec{x})\} = \vec{0}, \quad (17)$$

wherein $$\vec{y} = f_1(\vec{x}) = \{f_{1,1}(\vec{x}), f_{1,2}(\vec{x})\}^T, \quad (18)$$

and $$\vec{y} = f_2(\vec{x}) = \{f_{2,1}(\vec{x}), f_{2,2}(\vec{x})\}^T. \quad (19)$$

When each component of equation (17) is expressed separately, the following is obtained:

$$\{\vec{y} - f_1(\vec{x})\} \otimes \{\vec{y} - f_2(\vec{x})\} = \quad (20)$$
$$\begin{bmatrix} \{y_1 - f_{1,1}(\vec{x})\}(y_1 - f_{2,1}(\vec{x})) & \{(y_1 - f_{1,1}(\vec{x}))(y_2 - f_{2,2}(\vec{x}))\} \\ \{y_2 - f_{1,2}(\vec{x})\}(y_1 - f_{2,1}(\vec{x})) & \{y_2 - f_{1,2}(\vec{x})\}(y_2 - f_{2,2}(\vec{x})) \end{bmatrix} = \vec{0}.$$

Even if $f_1$ and $f_2$ are exchanged with each other, the equation must not change, in consideration of the meaning of the problem. Therefore, the following equation is derived:

$$\frac{1}{2}\{[\vec{y} - f_1(\vec{x})] \otimes [\vec{y} - f_2(\vec{x})] + [\vec{y} - f_2(\vec{x})] \otimes [\vec{y} - f_1(\vec{x})]\} = \vec{0}. \quad (21)$$

Then the following three equations are introduced:

$$y_1^2 - \{f_{1,1}(\vec{x}) + f_{2,1}(\vec{x})\}y_1 + f_{1,1}(\vec{x})f_{2,1}(\vec{x}) = 0,$$

$$y_2^2 - \{f_{1,2}(\vec{x}) + f_{2,2}(\vec{x})\}y_2 + f_{1,2}(\vec{x})f_{2,2}(\vec{x}) = 0,$$

$$2y_1 y_2 - \{f_{1,2}(\vec{x}) + f_{2,2}(\vec{x})\}y_1 - \{f_{1,1}(\vec{x}) + f_{2,1}(\vec{x})\}y_2$$
$$+ \{f_{1,1}(\vec{x})f_{2,2}(\vec{x}) + f_{1,2}(\vec{x})f_{2,1}(\vec{x})\} = 0. \quad (22)$$

(2) For replacement of the four unknown functions $f_{1,1}(\vec{x})$, $f_{1,2}(\vec{x})$, $f_{2,1}(\vec{x})$ and $f_{2,2}(\vec{x})$, six unknown functions $F_k(x)$ (k=0, 1, 2, 3, 4, 5) are defined as follows:

$$F_1(\vec{x}) = \{f_{1,1}(\vec{x})f_{2,1}(\vec{x})\}F_0(\vec{x})$$

$$F_2(\vec{x}) = \{f_{1,2}(\vec{x})f_{2,2}(\vec{x})\}F_0(\vec{x})$$

$$F_3(\vec{x}) = \{-[f_{1,1}(\vec{x}) + f_{2,1}(\vec{x})]\}F_0(\vec{x})$$

$$F_4(\vec{x}) = \{-[f_{1,2}(\vec{x}) + f_{2,2}(\vec{x})]\}F_0(\vec{x})$$

$$F_5(\vec{x}) = [f_{1,1}(\vec{x})f_{2,2}(\vec{x}) + f_{1,2}(\vec{x})f_{2,1}(\vec{x})]F_0(\vec{x}). \quad (23)$$

Then all of the three equations (22) become linear with respect to the unknown functions $F_k(x)$ (k=0, 1, 2, 3, 4, 5) as follows:

$$F_0(\vec{x})y_1^2 + F_3(\vec{x})y_1 + F_1(\vec{x}) = 0$$

$$F_0(\vec{x})y_2^2 + F_4(\vec{x})y_2 + F_2(\vec{x}) = 0$$

$$2F_0(\vec{x})y_1 y_2 + F_4(\vec{x})y_1 + F_3(\vec{x})y_2 + F_5(\vec{x}) = 0 \quad (24)$$

(3) Each of the unknown functions $F_k(x)$ (k=0, 1, 2, 3, 4, 5) is expressed as follows:

$$F_k(\vec{x}) = \sum_{p=1}^{M} r_{kp} K_k(\vec{x}, \vec{x}(i)) + \sum_{j=1}^{d_k} s_{kj} \phi_{kj}(\vec{x}) \quad (25)$$

wherein $K_k(\vec{x}, \vec{x}_{(i)})$ is a local base function centering at $\vec{x}_{(i)}$, and $\phi_{kj}(\vec{x})$ is the base of a multi-variable polynomial with $\vec{x}$ as a variable.

(4) An error function is defined by the following equation:

$$E[F_k] = \sum_{i=1}^{N} \{F_0(\vec{x}_{(i)}) + (y_{1(i)})^2 + F_3(\vec{x}_{(i)}) y_{1(i)} + F_1(\vec{x}_{(i)})\}^2 +$$
$$\sum_{i=1}^{N} \{F_0(\vec{x}_{(i)})(y_{2(i)})^2 + F_4(\vec{x}_{(i)}) y_{2(i)} + F_2(\vec{x}_{(i)})\}^2 +$$
$$\frac{1}{2} \sum_{i=1}^{N} \{2F_0(\vec{x}_{(i)})(y_{1(i)} y_{2(i)}) + F_4(\vec{x}_{(i)}) y_{1(i)} +$$
$$F_3(\vec{x}_{(i)}) y_{2(i)} + F_5(\vec{x}_{(i)})\}^2 \quad (26)$$

(5) The regularization operator $S_k$ is defined such that $$S_k \sum_i a_{ki}(\vec{x}) \frac{\partial^{i_1 + \ldots + i_n}}{\partial x_1^{i_1} \ldots \partial x_n^{i_n}}$$

where $i = (i_1, i_2, \ldots, i_n)$, provided that $$\sum_i \equiv \sum_{i_1} \sum_{i_2} \cdots \sum_{i_n}$$

and $a_{ki}(\vec{x})$ is a function of $\vec{x}$. In that case, the regularizing functional of the unknown function $F_k$ is $$\|S_k F_k(\vec{x})\|^2. \quad (27)$$

(6) A procedure is obtained for minimizing the function $$\bar{E}[F_k] = E[F_k] + \sum_{k=0}^{5} \|S_k F_k(\vec{x})\|^2 \quad (28)$$

under the condition of $$\sum_{k=0}^{5} \left( \sum_{p=1}^{M} r_{kp}^2 + \sum_{j=1}^{d_k} s_{kj}^2 \right) = 1.$$

This procedure is performed according to a traditional method such as Lagrange's method of indeterminate coefficients for conditioned optimization. Many other variations of standard optimization methods are possible.

(7) Equation (23) is solved for $f_{i,j}$ in order to obtain $f_{i,j}$ from $F_k$. In the present case, equation (23) can be solved easily to yield the following formulas:
The following functions are calculated first:

$$f_{+,1}(\vec{x}) = \frac{1}{2F_0(\vec{x})} \left[ -F_3(\vec{x}) + \sqrt{\{F_3(\vec{x})\}^2 - 4F_1(\vec{x})} \right] \quad (29)$$

$$f_{-,1}(\vec{x}) = \frac{1}{2F_0(\vec{x})} \left[ -F_3(\vec{x}) - \sqrt{\{F_3(\vec{x})\}^2 - 4F_1(\vec{x})} \right] \quad (30)$$

$$f_{+,2}(\vec{x}) = \frac{1}{2F_0(\vec{x})} \left[ -F_4(\vec{x}) + \sqrt{\{F_4(\vec{x})\}^2 - 4F_2(\vec{x})} \right] \quad (31)$$

$$f_{-,2}(\vec{x}) = \frac{1}{2F_0(\vec{x})} \left[ -F_4(\vec{x}) - \sqrt{\{F_4(\vec{x})\}^2 - 4F_2(\vec{x})} \right] \quad (32)$$

Then, out of the two pairs of the solutions, $$f_1(\vec{x}) = \{f_{+,1}(\vec{x}), f_{+,2}(\vec{x})\}^T$$
$$f_2(\vec{x}) = \{f_{-,1}(\vec{x}), f_{-,2}(\vec{x})\}^T \quad (33)$$

and $$f_1(\vec{x}) = \{f_{+,1}(\vec{x}), f_{-,2}(\vec{x})\}^T$$
$$f_2(\vec{x}) = \{f_{-,1}(\vec{x}), f_{+,2}(\vec{x})\}^T, \quad (34)$$

one pair is selected so that $$\|F_5(\vec{x}) - F_0(\vec{x})\{f_{1,1}(\vec{x}) f_{2,2}(\vec{x}) - f_{1,2}(\vec{x}) f_{2,1}(\vec{x})\}\| \quad (35)$$

may become smaller.

A third embodiment will next be described.

In this embodiment, the calculation procedure of mapping calculation module from the inputs to the outputs is described in reference to the mapping calculation module shown in FIG. 2 and the structure of the module shown in FIG. 3.

In FIG. 3, a unit $G_k$ calculates the term of $$\sum_{p=1}^{M} r_{kp} K_{kp}(\vec{x}, \vec{t}_{kp}), \quad (36)$$

and a unit $H_k$ calculates the term of $$\sum_{j=1}^{d_k} s_{kj} \phi_{kj}(\vec{x}). \quad (37)$$

The unit U is an algorithm for calculating a solution of an h-degree algebraic equation:

$$\Lambda(F_k, y^{[k]}) = F_h y^h + \ldots + F_j y^j + \ldots F_1 y + F_0 = 0 \quad (38)$$

For example, the unit U is an iterative algorithm with an initial value of $y = y^{(0)}$:

$$y^{[k+1]} := y^{[k]} - \frac{\Lambda(F_k, y^{[k]})}{\Lambda_y(F_k, y^{[k]})}, \quad (39)$$

wherein $$\Lambda_y = \frac{\partial \Lambda}{\partial y} = hF_h y^{h-1} + \ldots + jF_j y^{j-1} + \ldots + F_1. \quad (40)$$

The unit V is the same as Unit U except that it is an algorithm for calculating all the solutions simultaneously. For example, it is an iterative algorithm (Durand-Kerner method):

$$^j y^{[k+1]} := {}^j y^{[k]} - \frac{\Lambda(F_k, {}^j y^{[k]})}{\prod_{i=1, i \neq j}^{h} ({}^j y^{[k]} - {}^i y^{[k]})} \quad (41)$$

wherein j=1, 2, . . . , h).

$^j y$ is the j-th root of equation $\Lambda=0$ with respect to y, and $^i y$ is the i-th root of equation $\Lambda=0$ with respect to y.

Then the mapping calculation module for n inputs and m outputs and function $F_k$ (k=0, 1, . . . , h) is calculated for an input $\vec{x}$ as shown in FIG. 3 according to the following equation:

$$F_k(\vec{x}) = \sum_{p=1}^{M} r_{kp} K_{kp}(\vec{x}, \vec{t}_{kp}) + \sum_{j=1}^{d_k} s_{kj} \phi_{kj}(\vec{x}) \quad (42)$$

Next, for the case of scalar values, one or all of the h function values are calculated according to the algorithm introduced in the last step of the first embodiment (the part regarding the unit U and the unit V in the description referring to FIG. 3).

For the case of vector values, the algorithm may be used as described in Article (7) of the second embodiment.

The present invention is not limited to the above-described embodiments. Numerous modifications and variations of the present invention are possible in light of the spirit of the present invention, and they are not excluded from the scope of the present invention.

As described above, the learning method for multivalued mapping by the present invention provides the following effects:

According to the present invention, the method comprises the steps of: mathematically expressing a multivalued function directly in Kronecker's tensor product form; developing and replacing the function so as to obtain a linear equation with respect to an unknown function; defining a sum of a linear combination of a local base function and a linear combination of a polynomial base to the replaced unknown function; and learning or structuring a manifold which is defined by the linearized function in the input-output space, from example data, through use of a procedure for optimizing the error and the smoothness constraint. Therefore, mapping learning can be performed from a small amount of data.

Therefore, basic information treatment of non-linear problems may be performed, including applications to artificial neuro-circuit network, visual and auditory pattern information processing by a computer, and kinetic control of a robot arm.

What is claimed is:

1. A method for teaching functions of an artificial neural network in a computer module and for multivalued mapping for providing a method for approximation of a manifold in (n+m)-dimensional space, by learning a smooth function from n-dimensional input space to m-dimensional output space which optimally approximates m-dimensional vector value data forming a given plurality of layers in n-dimensional space, said method comprising the steps of:

(a) mathematically expressing a multivalued function directly in Kronecker's tensor product form;
   (b) developing and replacing the tensor product form so as to obtain a linear equation with respect to unknown functions;
   (c) defining the sum of a linear combination of local base functions and a linear combination of polynomial bases with respect to the replaced unknown functions;
   (d) learning from example data, a manifold which is defined by the linearized function in the input-output space, through use of a procedure for optimizing the error and the smoothness constraint; and
   (e) applying the manifold learned from the steps (a) to (d) to an artificial neuro-circuit network, to visual or auditory pattern information processing by a computer, or to kinetic control of a robot arm.

2. A method for teaching functions of an artificial neural network in a computer module and for multivalued mapping for providing a method for approximation of a manifold in (n+m)-dimensional space, by obtaining a smooth function from n-dimensional input space to m-dimensional output space which optimally approximates m-dimensional vector value data forming a given plurality of layers in n-dimensional space, said method comprising the steps of:

(a) expressing a manifold by synthesizing h m-dimensional vector value functions in n-dimensional space according to the below equations:

$$\{\vec{y} - f_1(\vec{x})\} \otimes \{\vec{y} - f_2(\vec{x})\} \otimes \ldots \otimes \{\vec{y} - f_h(\vec{x})\} = 0 \quad (2)$$

wherein "$\otimes$" denotes Kronecker's tensor product, $\vec{x} = (x_1, x_2, \ldots x_n)^T$, $\vec{y} = (y_1, y_2, \ldots y_m)^T$, and "$T$" denotes transposition of vector;

(b) developing the above equation and converting it into a linear equation with respect to unknown functions;
   (c) expressing each unknown function as:

$$F_k(\vec{x}) = \sum_{p=1}^{M} r_{kp} K_{kp}(\vec{x}, t_{kp}) + \sum_{j=1}^{d_k} s_{kj} \phi_{kj}(\vec{x})$$

wherein $K_{kp}(x, t_{kp})$, p=(0, 1, 2, . . . M) is a local base function centering at $t_{kp}$, $\phi_{kj}(x)$ is the base of a multi-variable polynomial equation having $x_i$ of $x=(x_1, x_2, \ldots x_n)$ as variables, and $r_{kp}$ and $s_{kj}$ are calculated factors;

(d) defining an error functional for calculating the error on the left side of Equation (2) for calculating the unknown function $F_k$ from example data;
   (e) defining a regularizing functional as the square of the absolute value or any other norm of the result of the operation in which the operator defining the smoothness constraint of the unknown function is applied to each unknown function, as required;

(f) minimizing the error functional and the regularizing function, and deriving a procedure for obtaining the unknown functions $F_k$;

(g) obtaining a conversion function for calculating $f_j$ from the unknown functions $F_k$ by formula manipulation method or by numerical approximation algorithm; and (h) applying the conversion function obtained by steps (a) through (g) to an artificial neuro-circuit network, to visual or auditory pattern information processing by a computer, or to kinetic control of a robot arm.

3. A method for teaching functions of an artificial neural network in a computer module and for multivalued mapping according to claim 2, wherein m is 1.

4. A method for teaching functions of an artificial neural network in a computer module and for multivalued mapping according to claim 2, wherein m is 2.

5. A method for teaching functions of an artificial neural network in a computer module and for multivalued mapping according to claim 2, wherein $$\vec{t}_{0p} = \vec{t}_{1p} = \vec{t}_{2p} = \ldots = \vec{t}_{hp}.$$

6. A method for teaching functions of an artificial neural network in a computer module and for multivalued mapping according to claim 2, wherein N pairs of example data are $[(\vec{x}_{(i)}, \vec{y}_{(i)})|i=1, 2, \ldots, N]$, and M=N, $\vec{t}_{kp} = \vec{x}_{(p)}$ (wherein p=1, 2, \ldots, N).

7. A method for teaching functions of an artificial neural network in a computer module and for multivalued mapping according to claim 2, wherein $K_{k1} = K_{k2} = \ldots = K_{kM}$ (wherein k=0, 1, 2, \ldots, h).

* * * * *

UNITED STATES PATENT AND TRADEMARK OFFICE
CERTIFICATE OF CORRECTION

PATENT NO. : 6,260,032 B1
DATED : July 10, 2001
INVENTOR(S) : Shizawa

It is certified that error appears in the above-identified patent and that said Letters Patent is hereby corrected as shown below:

Title page,
Item [57], ABSTRACT,
Line 8, "function" should read -- functions --.

Column 5,
Line 3, Formula (10), which reads:

" $E[F_k] = \frac{1}{N} \sum_{i=1}^{N} \{y_{(i)}^h F_h(\bar{x}_{(i)}) + y_{(i)}^{h-1}(\bar{x}_{(i)}) + \ldots + y_{(i)} F_1(\bar{x}_{(i)}) + F_0(\bar{x}_{(i)})\}^2$ "

should read:

$$E[F_k] = \frac{1}{N} \sum_{i=1}^{N} \left\{ y_{(i)}^h F_h\left(\bar{x}_{(i)}\right) + y_{(i)}^{h-1} F_{h-1}\left(\bar{x}_{(i)}\right) + \cdots + y_{(i)} F_1\left(\bar{x}_{(i)}\right) + F_0\left(\bar{x}_{(i)}\right) \right\}^2$$

Column 7,
Lines 15-25, Formula (26) which reads:

"
$$E[F_k] = \sum_{i=1}^{N} \{F_0(\bar{x}_{(i)}) + (y_{1(i)})^2 + F_3(\bar{x}_{(i)}) y_{1(i)} + F_1(\bar{x}_{(i)})\}^2 +$$

$$\sum_{i=1}^{N} \{F_0(\bar{x}_{(i)})(y_{2(i)})^2 + F_4(\bar{x}_{(i)}) y_{2(i)} + F_2(\bar{x}_{(i)})\}^2 +$$

$$\frac{1}{2} \sum_{i=1}^{N} \{2F_0(\bar{x}_{(i)})(y_{1(i)} y_{2(i)}) + F_4(\bar{x}_{(i)}) y_{1(i)} +$$

$$F_3(\bar{x}_{(i)}) y_{2(i)} + F_5(\bar{x}_{(i)})\}^2$$
"

UNITED STATES PATENT AND TRADEMARK OFFICE
CERTIFICATE OF CORRECTION

PATENT NO. : 6,260,032 B1
DATED : July 10, 2001
INVENTOR(S) : Shizawa

It is certified that error appears in the above-identified patent and that said Letters Patent is hereby corrected as shown below:

should read:

--
$$+ \sum_{i=1}^{N} \left\{ F_0\left(\vec{x}(i)\right)\left(y_{2(i)}\right)^2 + F_4\left(\vec{x}(i)\right)y_{2(i)} + F_2\left(\vec{x}(i)\right) \right\}^2$$

$$+ \frac{1}{2}\sum_{i=1}^{N} \left\{ 2F_0\left(\vec{x}(i)\right)y_{1(i)}y_{2(i)} + F_4\left(\vec{x}(i)\right)y_{1(i)} \right.$$

$$\left. + F_3\left(\vec{x}(i)\right)y_{2(i)} + F_5\left(\vec{x}(i)\right) \right\}^2$$
--.

Column 10,
Line 33, "equations" should read -- equation --.

Signed and Sealed this

Twenty-seventh Day of August, 2002

*Attest:*

*Attesting Officer*

JAMES E. ROGAN
*Director of the United States Patent and Trademark Office*